(12) United States Patent
Cox et al.

(10) Patent No.: US 7,149,402 B2
(45) Date of Patent: Dec. 12, 2006

(54) DEVICE FOR HOLDING FIELD TERMINATION LOAD ADAPTER FOR OPTICAL CONNECTORS

(75) Inventors: Larry R. Cox, Austin, TX (US); Edward B. Lurie, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 127 days.

(21) Appl. No.: 10/988,968

(22) Filed: Nov. 15, 2004

(65) Prior Publication Data

US 2006/0104588 A1     May 18, 2006

(51) Int. Cl.
G02B 6/00    (2006.01)
G02B 6/54    (2006.01)

(52) U.S. Cl. .................. 385/137; 385/134; 385/136

(58) Field of Classification Search ............... 385/137, 385/134, 136
See application file for complete search history.

(56) References Cited

U.S. PATENT DOCUMENTS

| | | | |
|---|---|---|---|
| 4,984,865 A | 1/1991 | Lee et al. | |
| 5,120,388 A * | 6/1992 | Knott | 156/294 |
| 5,481,634 A | 1/1996 | Anderson et al. | |
| 5,719,977 A | 2/1998 | Lampert et al. | |
| 6,318,903 B1 | 11/2001 | Andrews et al. | |

OTHER PUBLICATIONS

Product Manual, "SC, FC, and ST* Hot Melt Fiber Optic Connectors—Instructions"; 1998; 3M Company, Austin TX, pp. 1-24.*

U.S. Application entitled "Fiber Polishing Apparatus and Method for Field Terminable Optical Connectors", filed Nov. 15, 2004, having U.S. Appl. No. 10/988,816.

U.S. Application entitled "Field Termination Apparatus and Method for Small Form Factor Optical Connectors With Thermoplastic Adhesive", filed Nov. 15, 2004, having U.S. Appl. No. 10/988,965.

Product Manual, "SC, FC And ST* Hot Melt Fiber Optic Connectors—Instructions"; (1998); 3M Company, Austin, TX.

* cited by examiner

*Primary Examiner*—Frank G. Font
*Assistant Examiner*—Derek L. Dupuis
(74) *Attorney, Agent, or Firm*—Gregg H. Rosenblatt

(57) ABSTRACT

A device is provided for manipulating a load adapter for terminating an optical fiber in a connector having a ferrule portion and a barrel portion that can include a pre-loaded thermoplastic or thermoset adhesive material. The device comprises a body having a handle, a first arm extending from the handle, and a second arm extending from the handle. The first arm includes a first gripping portion adapted to grip a portion of the load adapter. The second arm includes a second gripping portion that is adapted to grip a portion of an optical fiber cable and that is axially displaced from the first gripping portion by a predetermined distance. At least one of the first and second arms is movable relative to the other arm. A method of terminating an optical fiber in a connector having a ferrule portion and a barrel portion that include a pre-loaded thermoplastic adhesive material is also provided. The moveable second gripping portion can provide fiber cable retention and axial strain relief for various diameters of optical fiber cable during the field termination process. Further, the movable arm(s) allow(s) for unobstructed insertion of the optical fiber into the connector.

11 Claims, 3 Drawing Sheets

DEVICE FOR HOLDING FIELD TERMINATION LOAD ADAPTER FOR OPTICAL CONNECTORS

BACKGROUND OF THE INVENTION

1. Field of the Invention

The present invention is directed to a manipulating or holding device and method used in the field termination of large and/or small form factor optical connectors having a thermoplastic or thermoset adhesive.

2. Related Art

Mechanical optical fiber connectors for the telecommunications industry are known. In recent years, an emphasis has been placed on the use of small form factor (SFF) optical fiber connectors, such as LC-type, MU-type and LX5-type optical connectors. For example, LC ("Lucent Connectors") optical-type connectors have been described in U.S. Pat. Nos. 5,481,634; 5,719,977; and 6,318,903. These connectors are used for joining optical fiber segments at their ends and for connecting optical fiber cables to active and passive devices. The LC form factor is about 50% smaller than the form factors for other conventional optical connectors, such as ST, FC, and SC-type connectors, which can be referred to as large form factor (LFF) connectors.

However, commercially available SFF connectors, such as LC connectors, are not well suited for field installations. Conventional adhesive materials include thermal, anaerobic or UV curing adhesives as well as the use of two-part epoxies and acrylates. For example, LC connectors typically use epoxy-based resins (e.g., two part epoxies) for fiber retention within the ferrule portion of the connector. These epoxies require about 10 to 15 minutes to heat cure after application. Once set, the fiber cannot be removed from the ferrule without breaking the fiber, thus making resetting of the optical fiber in the ferrule impractical.

SUMMARY OF THE INVENTION

According to a first aspect of the present invention, a device is provided for manipulating a load adapter for terminating an optical fiber in a connector having a ferrule portion and a barrel portion that include a pre-loaded thermoplastic adhesive material. The device comprises a body having a handle, a first arm extending from the handle, and a second arm extending from the handle. The first arm includes a first gripping portion adapted to grip a portion of the load adapter. The second arm includes a second gripping portion that is adapted to grip a portion of an optical fiber cable and that is axially displaced from the first gripping portion by a predetermined distance. At least one of the first and second arms is movable relative to the other arm.

According to another aspect of the present invention, a method of terminating an optical fiber in a connector having a ferrule portion and a barrel portion that include a pre-loaded adhesive material is provided. The method comprises providing a load adapter having the connector mounted therein that is receivable in a heat source. The method further comprises providing a device for manipulating the load adapter, such as the device described above. The method further comprises gripping the load adapter with the first gripping portion and disposing the load adapter in the heat source to activate the adhesive. The optical fiber is then inserted into the ferrule portion of the connector. The second arm of the manipulating device is then moved relative to the first gripping portion to place the second gripping portion in a position to grip a jacket portion of the optical fiber. The load adapter is then removed from the heat source using the device for manipulating the load adapter. After a predetermined time, the connector can be removed from the load adapter.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1A:
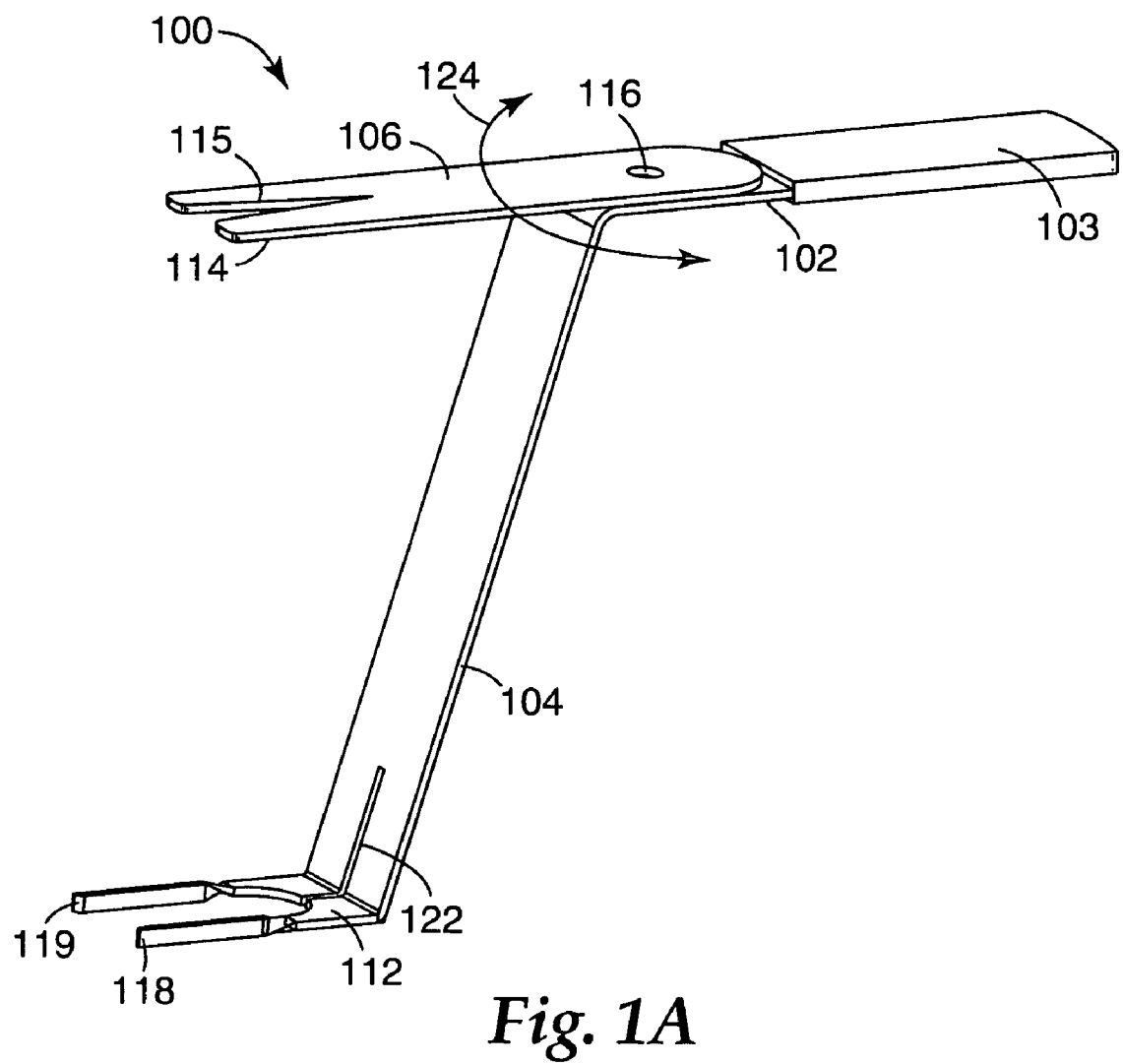
FIG. 1A shows an isometric view of a manipulating device according to an exemplary embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

The present invention is directed to a manipulating or holding device used in the field termination of large and/or small form factor optical connectors. The optical connectors can have a thermoplastic or thermoset adhesive preloaded therein.

According to an exemplary embodiment of the present invention, a manipulating or holding device is utilized during the field termination process of an optical connector that is loaded with a thermoplastic adhesive material. The holding device includes a first gripping portion that can be used to grip a "load adapter," which is a device that is designed to receive a small form factor (SFF), e.g., LC-type, MU-type, or LX5-type, or large form factor (LFF), e.g., SC, FC, and ST-type, optical fiber connector that includes a preloaded thermoplastic adhesive. The holding device further includes a moveable second gripping portion that is axially displaced from the first gripping portion and that can be used to grip an optical fiber cable during the field termination of the optical fiber connector. The second gripping portion can be designed to provide fiber cable retention and axial strain relief for various diameters of optical fiber cable during the field termination process.

Figure 1B:
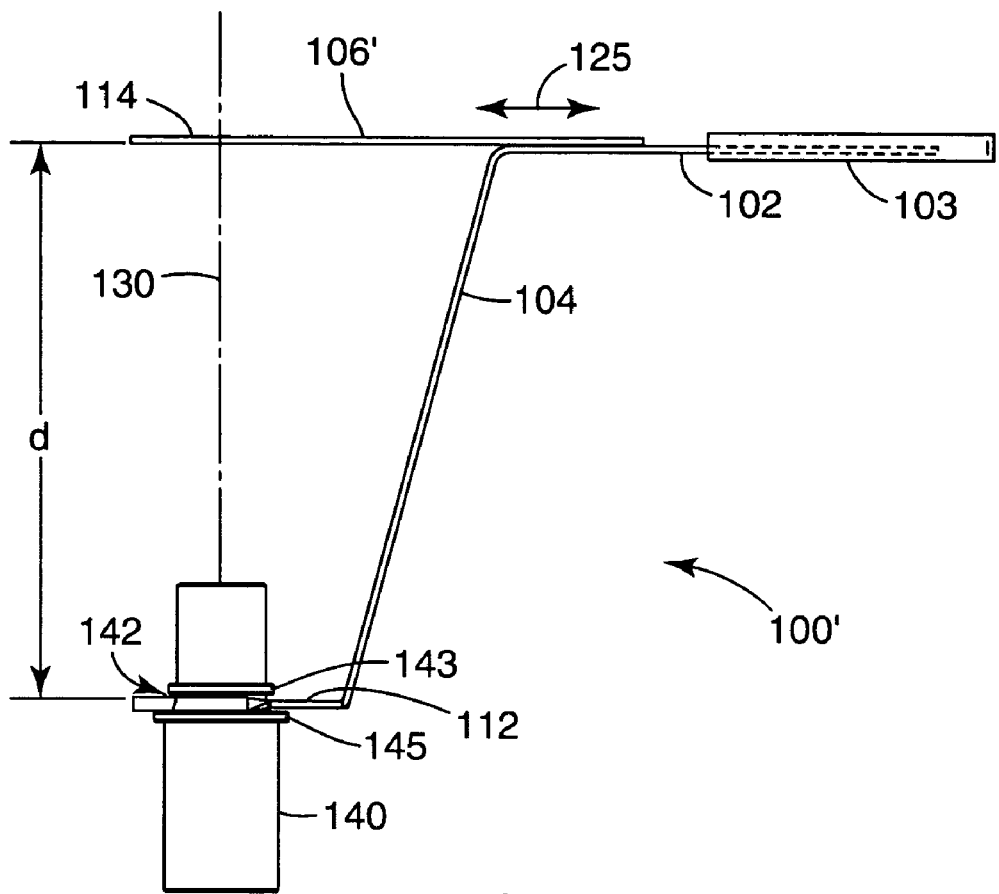
FIG. 1B shows a side view of the manipulating device according to an another exemplary embodiment of the present invention.

An isometric view of a first exemplary manipulating or holding device 100 and a side view of a second exemplary manipulating or holding device 100' are shown in FIGS. 1A and 1B. Device 100 includes a body having a handle 102, a first arm 104, and a second arm 106. The body of device 100 can be constructed from any substantially rigid material, such as a metal or a plastic material. In an exemplary embodiment, the handle and arms of device 100 are formed from a metal shim material, such as stainless steel. Aluminum, brass, plated metals and other substantially rigid, springy, heat resistant and or non-corrosive metals can also be used.

Handle 102 is preferably constructed to allow a field technician to readily grip or handle device 100. In this exemplary embodiment, handle 102 further includes a handle cover 103, preferably formed from a soft, non-slip, grippable material, such as a plastic or vinyl material. Handle cover 103 can further provide at least a small amount of insulation when the device 100' is gripping a heated "load adapter," such as load adapter 140, shown in FIG. 1B.

As shown in FIG. 1A, first arm 104 extends away from handle 102. First arm 104 further includes a first gripping portion 112, configured to hold or grip a load adapter 140, such as shown in FIG. 1B. The first gripping portion can be constructed in a variety of ways, such as comprising one or more prongs, to hold or grip load adapter 140. In this exemplary embodiment, first gripping portion 112 comprises a pair of prongs, 118, 119 that retain load adapter 140. The load adapter 140 can include a grip region 142, such as a grooved or indented area. In this example, the load adapter 140 can further include one or more protrusions or rings 143, 145 that form one or more grooves or flats that can receive prongs 118, 119 in a snug, sliding fit. In a further exemplary embodiment, the gripping portion 112 can include a mechanism, such as a slit 122 formed in one or both of the first arm 104 and the first gripping portion 112, to provide a spring-like retaining force for the first gripping portion 112, thus providing retention ability for different-sized load adapters.

As shown in FIG. 1A, second arm 106 also extends from handle 102. Second arm 106 includes a second gripping portion 114 that is designed to retain an optical fiber cable during a field termination process. In an exemplary embodiment, the second gripping portion 114 is axially spaced apart from the first gripping portion 112 by a distance "d", such as is shown in FIG. 1B, to provide connector clearance and optical fiber cable retention during the field termination process.

The second gripping portion can be shaped in a variety of ways to provide cable retention. For example, as shown in FIG. 1A, gripping portion 114 can be formed as a small-angled V-shaped cutout or groove 115, which allows retention of the fiber jacket portion of a variety of different fiber cables (e.g., larger diameter cable jackets are retained toward the outer edge of the V-shaped cutout or groove, and smaller diameter cable jackets are retained toward the inner portion of the V-shaped cutout or groove). Other suitable configurations for gripping portion 114 would be apparent to one of ordinary skill in the art given the present description.

Figure 1C:
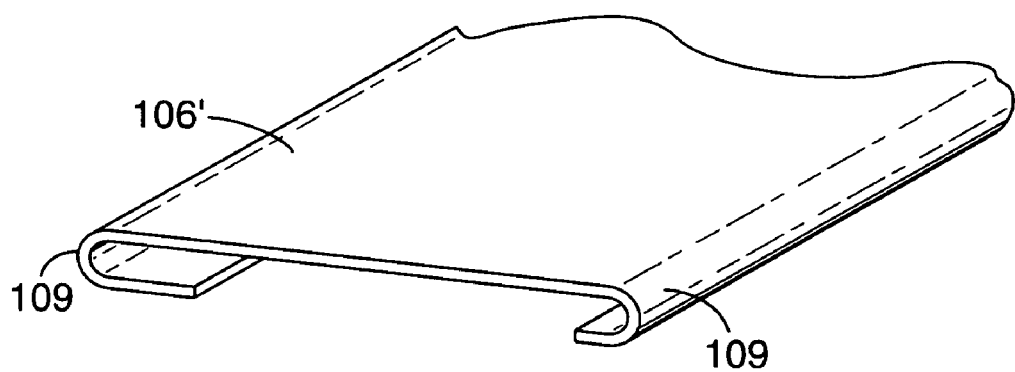
FIG. 1C shows an isometric view of an alternative construction for the moveable second arm of the manipulating device according to another exemplary embodiment of the present invention.

According to exemplary embodiments of the present invention, at least one of the first and second arms is moveable relative to the other arm. In the exemplary embodiment of FIGS. 1A and 1B, second arm 106, 106' is moveable to allow second gripping portion 114 to be placed in a position axially aligned with first gripping portion 112 (about axis 130), or in a non-aligned position (see e.g., FIG. 2A). For example, as shown in FIG. 1A, second arm 106 can be rotated in either a clockwise or counterclockwise direction, about pivot point 116, as illustrated by direction arrow 124. In an alternative embodiment, as shown in FIG. 1B, arm 106' can be moved by a sliding movement, as illustrated by direction arrow 125, towards or away from axis 130. In an alternative embodiment, as shown in FIG. 1C, arm 106' can be configured to include wrap-over outer edges 109 to wrap around the edges of the handle portion 102 to allow sliding movement towards or away from axis 130. Thus, as discussed further below, during an optical fiber insertion operation, arm 106, 106' can be slid or rotated to the side to provide an unobstructed axial view of the load adapter to a field technician, and to allow unobstructed access to the load adapter and/or installation of the fiber/cable into the softened adhesive present in the ferrule/barrel assembly.

The previous configurations and constructions of device 100, 100' are not meant to be limiting. For example, an alternative construction can include a handle portion that is co-planar with the first arm and the first gripping portion of the device. In a further alternative, the handle portion can be provided at an axial position between the first and second arms. Another alternative embodiment can include a gripping portion that provides gripping action through the use of a spring and/or a scissor-type construction. Thus, further configurations of the manipulating device 100 are contemplated by the present invention, as would be apparent to one of ordinary skill in the art given the present description.

FIG. 1B also shows a side view of an exemplary load adapter 140. A "load adapter" is a device that is designed to receive a small form factor (SFF), e.g., LC-type, MU-type, or LX5-type, optical fiber connector, or a large form factor (LFF), e.g., ST-type, FC-type, or SC-type, optical fiber connector during a field termination process. The optical fiber connector can include a preloaded thermoplastic or thermoset adhesive loaded in the ferrule and/or barrel portions of an optical fiber connector. In the present exemplary embodiment, load adapter 140 is configured to receive a LC-type optical connector preloaded with thermoplastic adhesive. Exemplary LC-type connector designs and exemplary thermoplastic adhesive materials are described in commonly-owned and co-pending U.S. patent application Ser. No. 10/811,437, incorporated by reference herein in its entirety.

The load adapter can then be placed in a field oven or heating device (see e.g., FIGS. 2A and 2B) to heat the preloaded thermoplastic adhesive to an appropriate temperature to receive an optical fiber. Exemplary load adapters and methods of exemplary field termination can provide for practical field termination of an optical fiber in a SFF or LFF optical fiber connector, as is described in a commonly-owned and co-pending U.S. patent application Ser. No. 10/988,965 entitled "Field Termination Apparatus and Method For Small Form Factor Optical Connectors with Thermoplastic Adhesive," incorporated by reference herein in its entirety.

Figure 2A:
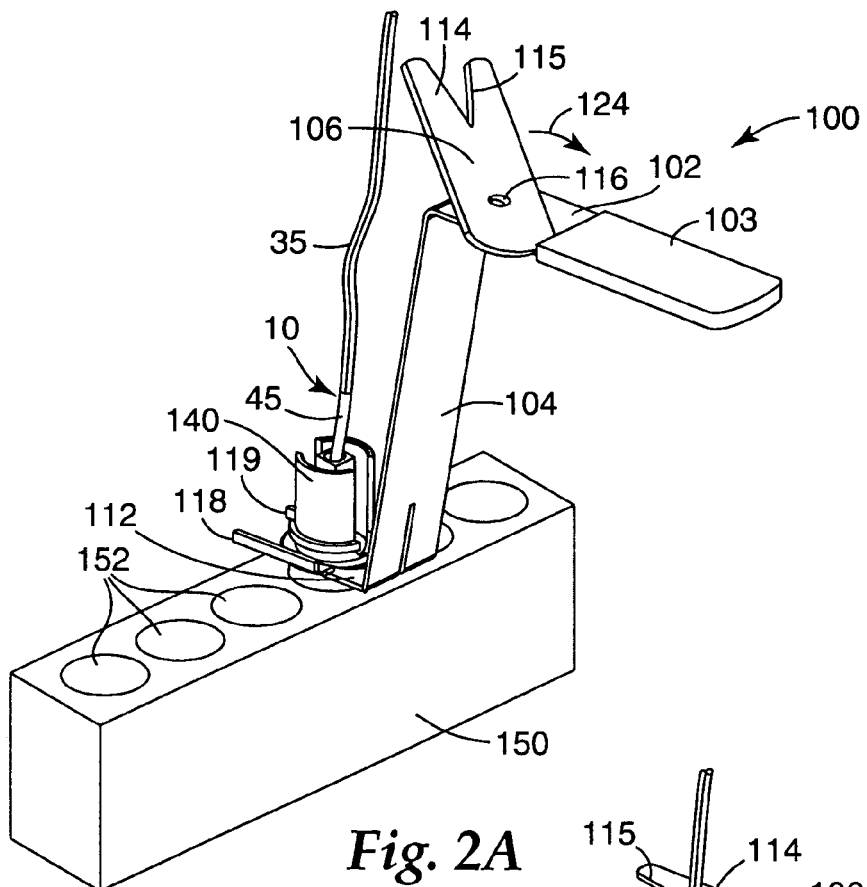
FIGS. 2A and 2B show isometric views of a field termination process using the manipulating device according to an exemplary embodiment of the present invention.
Figure 2B:
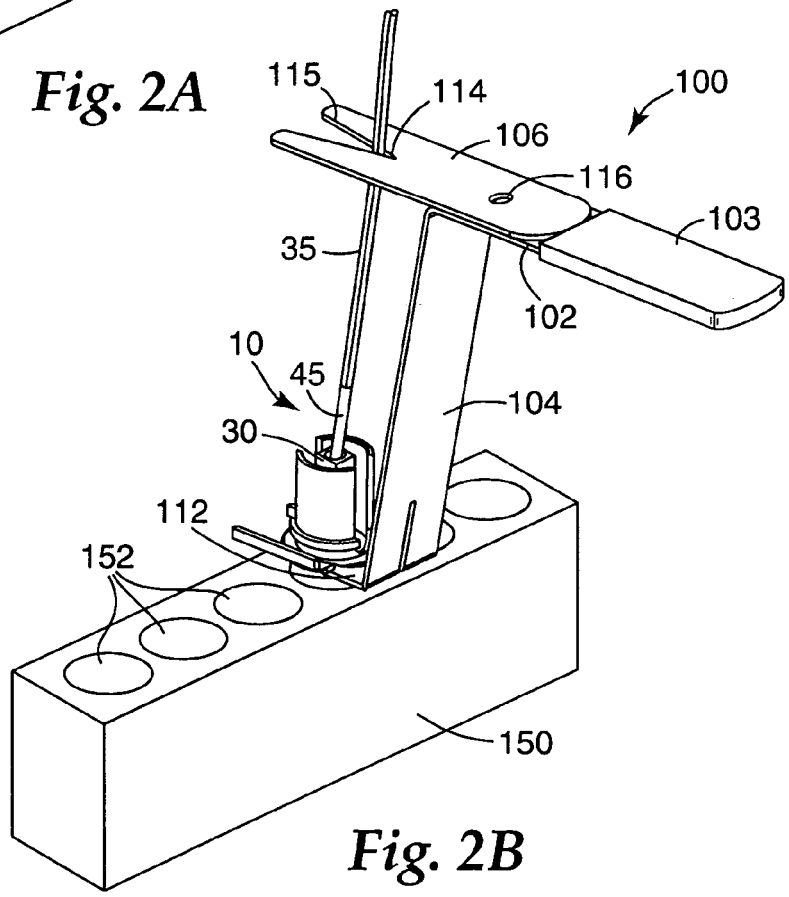

An exemplary field termination procedure using manipulating device 100 is shown in FIGS. 2A and 2B. In FIG. 2A, device 100 includes a handle 102 (with a handle cover 103), a first arm 104 having a first gripping portion 112, and a second arm 106 having a second gripping portion 114. A load adapter 140 can be gripped by prongs 118, 119 of the first gripping portion 112 of device 100. An optical fiber connector 10, further including a connector housing 30 and an optical fiber ferrule/barrel assembly loaded with thermoplastic adhesive or thermoset (not shown), can be mounted in a connector mounting section of load adapter 140. Optical fiber connector 10 can be a LC-type connector housing, such as described in commonly-owned and co-pending U.S. patent application Ser. No. 10/988,965 entitled "Field Termination Apparatus and Method For Small Form Factor Optical Connectors with Thermoplastic Adhesive," incorporated by reference above. Further, load adapter 140 can be placed in an oven port 152 of field oven 150 or other suitable heating source. For example, oven 150 can include one or more oven ports 152, which allow for the termination of single/multiple optical fiber connectors in the field. Oven 150 is preferably portable and can provide adjustable oven port temperatures of at least 200° C. Exemplary portable ovens are supplied by Kitco, located in Virginia.

In one embodiment, the configuration of the device 100 allows the load adapter 140 to rest in oven port 152 without a portion of device 100 touching a surface of the oven's heating block. As the investigators have determined, when a portion of device 100 rests on the surface of the heating block, the device 100 can act as a heat-spreader, which can dissipate heat, thus limiting adequate heating of the load adapter 140, either by failure to reach ultimate temperature or an increased time to reach the desired temperature. Preferably, the thermal transfer area from the load adapter 140 to the device 100 is minimized (e.g., by using prongs with a small surface area).

In FIG. 2A, second arm 106 is placed in an "open" position (i.e., such that second gripping portion 114 is not axially aligned with first gripping portion 112). This arm placement provides a field technician with unobstructed access along the axis of the ferrule/barrel assembly of connector 10 while the technician inserts an optical fiber cable 35, preferably having a prepared (e.g., cut and/or stripped) fiber end (not shown) into optical fiber connector 10, where the prepared end can be inserted through the activated (e.g., heated and softened) thermoplastic adhesive or, alternatively, the activated (viscous, uncured) thermoset.

As shown in FIG. 2B, second arm 106 can then be moved to an axially aligned position, e.g., by rotating arm 106 about pivot point 116, to place the second gripping portion 114 in a position to grip a jacket portion of the optical fiber cable 35 to hold the fiber centered in the ferrule/barrel until the adhesive is set (cools). After insertion of the optical fiber cable and the gripping of the jacket portion of the optical fiber cable, the load adapter 140 can be removed from the heat source 150 using the device 100. In an exemplary embodiment, the load adapter 140 is removed from the oven 150 while the second arm 114 is placed in the axially aligned position. Thus, for example, during cooling of the thermoplastic adhesive, the second gripping portion can provide fiber cable retention and axial strain relief for various diameters of optical fiber cable. For example, the retention of fiber cable 35 by gripping portion 114 reduces the likelihood of axial movement (e.g., movement either up or down) and/or translational movement (e.g., side to side) by fiber cable 35 during the heating and/or cooling cycles. Both of these fiber movements can cause poor connector performance through micro- or macro-bend attenuation or long term static fatigue (e.g., cracking). Micro-stresses can be caused, for example, by a bent fiber at the cable/connector interface.

After a predetermined "cooling" time, the fiber cable 35 can be removed from second gripping portion 114 (e.g., by gently sliding the cable from V-groove 115) and the connector 10 can be removed from the load adapter 140. Further, a fiber boot or other fiber cable retention device can be disposed at an appropriate fiber cable position, e.g., fiber cable position 45 shown in FIGS. 2A and 2B, to further protect the optical fiber cable from bend related stress losses.

The terminated optical fiber connector can then be polished to provide sufficient optical operation. Exemplary polishing techniques for field terminated optical fiber connectors are described in a commonly-owned and co-pending U.S. patent application Ser. No. 10/988,816 entitled "Fiber Polishing Apparatus and Method For Field Terminable Optical Connectors," incorporated by reference herein in its entirety.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A device for manipulating a load adapter for terminating an optical fiber in a connector having a ferrule portion and a barrel portion that include a pre-loaded adhesive material, comprising:
   a body having
   a handle,
   a first arm extending from the handle, wherein the first arm includes a first gripping portion adapted to grip a portion of the load adapter, and
   a second arm extending from the handle, wherein the second arm includes a second gripping portion adapted to grip a portion of an optical fiber cable and axially displaced from the first gripping portion by a predetermined distance, and wherein at least one of the first and second arms is movable relative to the other arm.

2. The device of claim 1, wherein the first gripping portion comprises one or more prongs.

3. The device of claim 2, wherein the one or more prongs comprises a pair of prongs adapted to be slidably received by one or more grooves formed on an outer surface of the load adapter.

4. The device of claim 2, wherein the one or more prongs comprises a pair of prongs adapted to be slidably received by one or more flats formed on an outer surface of the load adapter.

5. The device of claim 2, further comprising a slit formed in at least one of the first gripping portion and the first arm to provide a spring-like retaining force.

6. The device of claim 1, wherein the second arm is rotatable about a pivot point disposed on the handle.

7. The device of claim 1, wherein the second arm is slidable on the handle.

8. The device of claim 1, wherein the second gripping portion comprises a V-shaped cutout.

9. The device of claim 1, wherein the body comprises a metal shim material.

10. The device of claim 1, wherein the handle further includes a cover material.

11. The device of claim 1, wherein the second arm is movable to a position such that the second gripping portion is axially aligned with the first gripping portion.

* * * * *